United States Patent
Hoben

(10) Patent No.: US 6,691,449 B1
(45) Date of Patent: Feb. 17, 2004

(54) FISHING HOOK

(75) Inventor: Donald M. Hoben, Westminster, CO (US)

(73) Assignee: Matzu America, Inc., Denver, CO (US)

( * ) Notice: Subject to any disclaimer, the term of this patent is extended or adjusted under 35 U.S.C. 154(b) by 0 days.

(21) Appl. No.: 10/197,379

(22) Filed: Jul. 17, 2002

(51) Int. Cl.$^7$ ............................................. A01K 83/00
(52) U.S. Cl. .................................... 43/43.16; 43/43.2
(58) Field of Search .......................... 43/43.16, 43.81, 43/43.2

(56) References Cited

U.S. PATENT DOCUMENTS

| | | | | |
|---|---|---|---|---|
| 141,910 | A | * 8/1873 | Aleen ........................ 43/43.16 |
| 377,033 | A | * 1/1888 | Kerrison .................... 43/43.16 |
| 620,896 | A | 3/1899 | Edger | |
| 627,179 | A | * 6/1899 | Dreese ....................... 43/43.16 |
| 648,552 | A | * 5/1900 | Crane ......................... 43/43.16 |
| 827,757 | A | 8/1906 | Shakespeare, Jr. | |
| 1,055,104 | A | 3/1913 | Norsdall | |
| 1,706,881 | A | * 3/1929 | Hampson ................... 43/43.16 |
| 2,233,338 | A | * 2/1941 | Brewer ...................... 43/43.16 |
| 2,526,240 | A | 10/1950 | Labunde | |
| 2,531,981 | A | * 11/1950 | Liebe ......................... 43/43.16 |
| 2,651,134 | A | 9/1953 | Kemmerer | |
| 3,604,143 | A | 9/1971 | Sauers | |
| 3,754,347 | A | 8/1973 | McGahee | |
| 4,621,449 | A | 11/1986 | Nakagawa | |
| D288,467 | S | 2/1987 | Sitton | |
| 4,757,634 | A | 7/1988 | Meixsell, Jr. | |
| 4,833,816 | A | 5/1989 | Sitton et al. | |
| 4,835,898 | A | * 6/1989 | Pond ......................... 43/43.16 |
| 4,862,632 | A | 9/1989 | Kattenberg | |
| 4,905,402 | A | * 3/1990 | Clark ......................... 43/43.16 |
| 4,928,423 | A | 5/1990 | Furuta | |
| 4,930,249 | A | 6/1990 | Johns | |
| 5,084,998 | A | 2/1992 | Dixon | |
| D370,520 | S | 6/1996 | Kahng | |
| 5,524,385 | A | 6/1996 | Longo | |
| 5,526,603 | A | * 6/1996 | Fujii et al. ................. 43/43.16 |
| 5,664,364 | A | * 9/1997 | Clark ......................... 43/43.16 |
| 5,806,233 | A | 9/1998 | Murphy | |
| 5,901,493 | A | * 5/1999 | Tolliver ..................... 43/43.16 |
| 6,237,277 | B1 | * 5/2001 | Hildman .................... 43/43.16 |
| 6,481,149 | B1 | * 11/2002 | Hall et al. .................. 43/43.16 |

* cited by examiner

Primary Examiner—Charles T. Jordan
Assistant Examiner—Bret Hayes
(74) Attorney, Agent, or Firm—Seyfarth Shaw LLP

(57) ABSTRACT

A fish hook includes a head having a first portion adapted for coupling to a fishing line. A substantially straight shank is coupled to and projecting downwardly from the head. A substantially straight leg is coupled to the shank, the leg projecting downwardly from the shank and projecting outwardly from the axis of the shank. A curved bite has a first end coupled to the shank, forming a valley therebetween. In one form, the bite has a second end that is shaped such that a first line tangent to the second end intersects a second line connecting the lowermost point of the valley and the first portion of the head. In one form, the angle between the leg and the axis of the shank is greater than 45°.

11 Claims, 1 Drawing Sheet

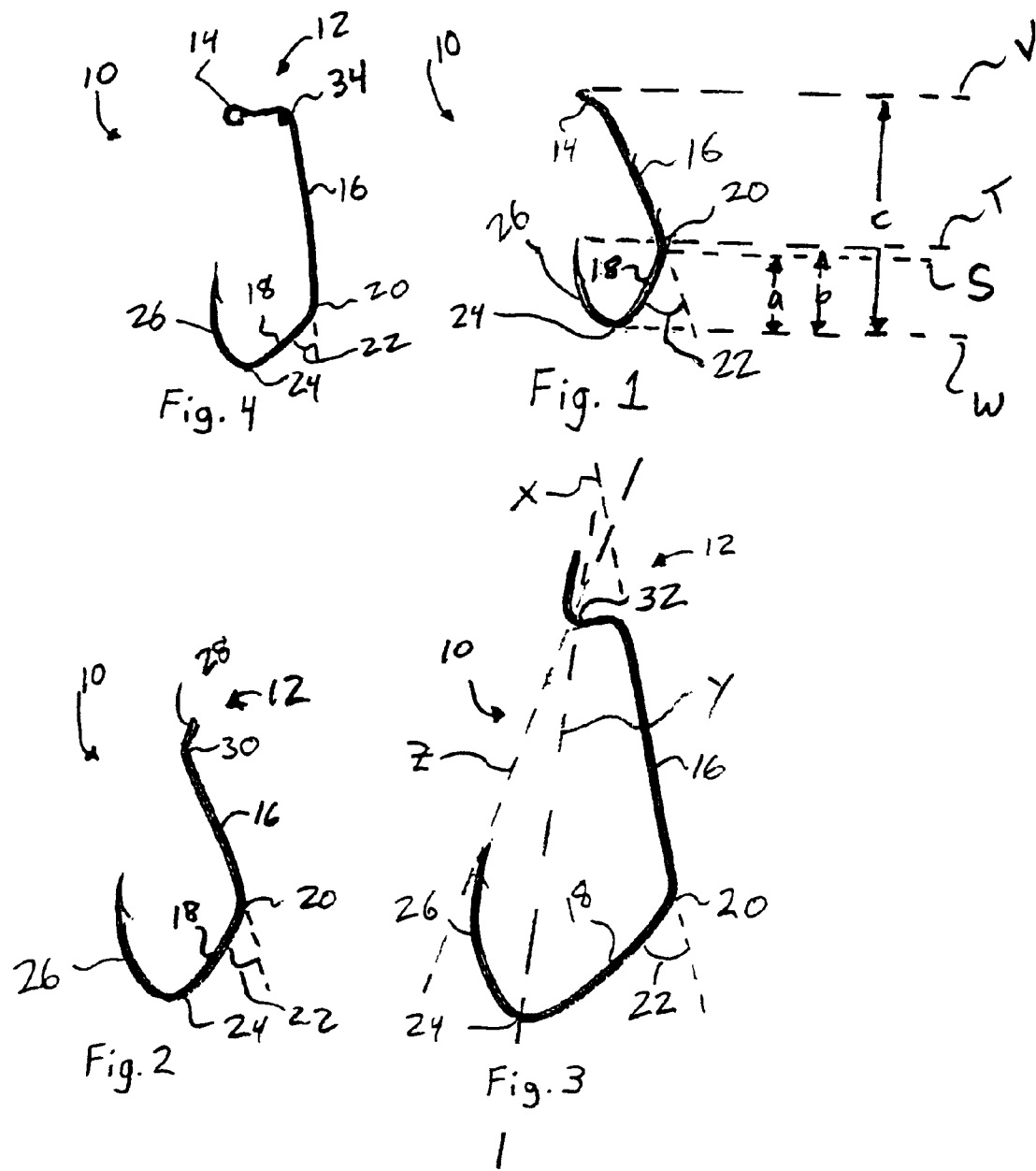

FISHING HOOK

BACKGROUND

The following disclosure relates to hooks, and has particular application to fishing hooks that are used for barb-free fishing.

Barb-free fishing, i.e., fishing using barb-free hooks, has become more common among sportsman who practice catch and release. Additionally, barb-free fishing has become more common because of conservation efforts and attempts to minimize harm to the fish that are being caught and released. Furthermore, certain bodies of water are designated for barb-free fishing only.

Much of the time, the hook that is used for barb-free fishing originally had a barb. In that case, the user has to crimp the barb down using a pliers, or another suitable instrument, so that the hook no longer has a barb. Alternatively, the barb can be removed by filing, grinding, or any other suitable method.

A wide variety of fishing hooks have been designed and used for various purposes. Many of these hooks can have their barbs easily removed and be used for barb-free fishing. Examples of such prior fishing hooks are shown in U.S. Pat. Nos. 620,896; 827,757; 1,055,104; 2,526,240; 2,651,134; 3,604,143; 3,754,347; 4,621,449; 4,757,634; 4,833,816; 4,862,632; 4,928,423; 4,930,249; 5,084,998; 5,524,385; 5,806,233; Des. 370,520; and Des. 288,467.

While some of these designs may be perfectly adequate for some uses, they may not work very well when the barb has either been crimped down or removed for barb-free fishing. For most of these designs, when the hook is made barb-free, the design of the resulting hook allows a fish to flip off of, or otherwise escape from, the hook.

Because of the growing popularity of barb-free fishing, a need exists for an improved hook design that can be used for barb-free fishing and reduce the chance of a fish flipping off, or otherwise escaping from, the barb-free hook.

SUMMARY

The disclosed apparatus and methods avoids some of the disadvantages of prior devices and methods while affording additional structural and operating advantages.

The disclosed hook includes a long curved bite that curves back toward the remainder of the hook.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a front plan view of a bait-holder fish hook;

FIG. 2 is a front plan view of a octopus-beak fish hook;

FIG. 3 is a front plan view of a wide gap-worm hook; and

FIG. 4 is a front plan view of a jig hook.

DETAILED DESCRIPTION

Turning now to the drawings, and, more particularly, to FIG. 1 thereof, there is depicted a fishing apparatus for catching fish in the form of fish hook 10. In one form, hook 10 is a single integral piece manufactured from any suitable metal or other suitable material. For example, hook 10 can be formed of steel or titanium wire. It is also possible that hook 10 could be formed of a suitable polymer or other material. Hook 10 includes head 12. A portion of head 12, such as eye 14 (side view shown in FIG. 1), is used to attach a line to hook 10. Although in FIG. 1, eye 14 is the portion of head 12 that the line is attached to, it can be any other suitable portion including, for example, tying portion 6, notch 10, or the mushroom-like stopping part 3 shown in the various figures of U.S. Pat. No. 4,621,449.

Head 12 is coupled to shank 16, which extends generally downwardly from head 12. Shank 16 is preferably substantially straight. However, shank 16 could be slightly curved, or otherwise slightly bent, without rendering the hook useless. Additionally, shank 16 could be bent in a variety of more complex shapes while allowing the hook to function and without causing the hook to be useless. However, a substantially straight shank is believed to be less complicated to manufacture and more economical to manufacture. Additionally, a substantially straight shank is a traditional shape for fish hooks.

Leg 18 is coupled to the end of shank 16 at bend 20, which is opposite the end attached to head 12. Leg 18 extends generally downward, away from head 12, and outward toward one side of shank 16. In one form, leg 18 is substantially straight. However, leg 18 could also have a small curvature and still work effectively. In one form, leg 18 can be at an angle 22 that is approximately 45° to 70° offset from shank 16. In another form, angle 22 ranges from 50° to 65° degrees, or from 55° to 60° and can be, for example, approximately 54° or 58°. Leg 18 ends in a sharp bend that forms valley 24. Valley 24 is coupled to and transitions into curved bite 26. In one form, bite 26 is curved upward in such a manner that its slope increases at increasing distances from valley 24, at least for a portion of bite 26 located adjacent valley 24.

In one form, bite 26 curves around toward shank 16 such that a line tangent to the bite 26 at the free end thereof (see line Z in FIG. 3) intersects eye 14, or intersects the portion of head 12 that the line is tied to. In another form, a line tangent to bite 26 at its free end (see line Z in FIG. 3) intersects with shank 16, or intersects with a line extending from shank 16 (see line X in FIG. 3). In other words, bite 26 tends to curve around toward some portion of the rest of hook 10. In one form, a line tangent to bite 26 at its free end (see line Z in FIG. 3) intersects with a straight line between the lowermost point of valley 24 and eye 14, or between the lowermost point of valley 24 and the portion of head 12 that the line is tied to (see line Y in FIG.3).

Hook 10 has an overall height "c" measured between line W tangent to valley 24, at its lowermost point, to line V, which is parallel to line W and intersects eye 14. In an alternative form, line V intersects the portion of head 12 that the fishing line is attached to. The free end, or point, of bite 26 has a height "b" measured between line W and line T, which is parallel to line W and intersects the uppermost point of bite 26. In one form, "b" is ⅓ or greater than the value of "c". Height "b" can be greater than or equal to 0.35"c", 0.4"c" and even 0.5"c" or 0.6"c". However, height "b" is always less than "c" and is generally less than or 0.9"c", 0.8"c", and even less than or equal to 0.7"c". In one form, height "b" is less than or equal to 0.6"c". Height "b" that is greater than or equal to 0.25"c", 0.27"c" or 0.3"c" may work in selected circumstances. Additionally, shank 16, leg 18, or both can be manufactured to create an unusually long, or short, height "c" in order to avoid the particular ratios discussed herein. Hereafter, such manufacture of unusually long or short shank 16 and/or leg 18 that creates no additional advantage for fishing is equivalent to a normal sized shank 16 or leg 18 and thus, any such ratio due to the unusual size is hereinafter deemed equivalent to the ratios discussed herein (both above and below). As seen in the drawings, all measured heights between two parallel lines (discussed above or below) are measured along the perpendicular to the parallel lines.

In one form, the free end or point of bite 26 projects upward and extends at least as high as bend 20 and in some cases extends upward of bend 20. The height "a" of bend 20 is measured between line W and line S, which is parallel to line W and intersects bend 20. In one form, "a" is equal to or greater than ⅓ "c".

Referring to FIGS. 2, 3 and 4, it should be noted that like numerals denote like parts. The octopus-beak hook of FIG. 2 does not include an eye. Instead, the line is attached at approximately the portion labeled 30 underneath tab 28. This type of attachment is similar to those shown in the various figures of U.S. Pat. No. 4,621,449. The wide gap worm hook of FIG. 3 has the lined snelled at approximately the portion labeled 32. The jig hook of FIG. 4 often has a ball of lead in corner 34 and is often connected to the fishing line with a leader at a point between eye 14 and ball of lead 34, such that the leader tends to contact lead 34 when the hook is in use.

The hooks of the present invention can be made with or without barbs. When the hooks are used for barb-free fishing, the barb is crimped down, or otherwise removed, to allow the hook to be easily removed from a fish after it is caught. In use, the fish bites hook 10 at approximately bite 26. Sloping leg 18 and gravity causes the fishes mouth to tend to rest in valley 24. The relatively long and inwardly curved (toward shank 16) bite 26 makes it more difficult for the fish to be able to flip off of, or otherwise get loose from, the hook.

While the fishing apparatus for catching fish has been described with respect to a plain fish hook, other devices containing hooks, such as the flies and other lures found in U.S. Pat. Nos. 4,930,249 and 5,806,233, are also considered to be within the scope of the invention. The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A fishing hook comprising:

a head including a first portion adapted for coupling to a fishing line;

a substantially straight shank coupled to the head at a first junction and projecting downwardly from the head and having a first longitudinal axis;

a substantially straight leg coupled to the shank at a second junction and having a second longitudinal axis inclined to the first axis at an acute external angle; and a curved bite coupled to the leg and forming an arcuate valley therewith, the bite having a distal end point, the valley being located so that a straight line segment extending from the first junction to a point of the valley furthest from the first junction has a first length, a second straight line perpendicular to the first straight line segment and passing through a distal end point of the bite being spaced a predetermined distance from the point of the valley furthest from the first junction, the valley defining a sharp bend having a radius substantially less than one-half the predetermined distance.

2. The hook of claim 1, wherein the external angle is at least 45 degrees.

3. The hook of claim 1, wherein the second straight line intersects the shank above the second junction.

4. The hook of claim 1, wherein the head is inclined to the first axis toward the bite.

5. The hook of claim 4, wherein the head is inclined to the first axis at an external angle substantially less than 45 degrees.

6. The hook of claim 4, wherein the head is inclined to the first axis at an external angle substantially greater than 45 degrees.

7. The hook of claim 2, wherein the head is inclined to the first axis away from the bite.

8. The hook of claim 2, wherein the head includes a first portion inclined to the first axis toward the bite and a second portion inclined to the first axis away from the bite.

9. The hook of claim 2, wherein a line tangent to the bite at its distal end point intersects the head.

10. The hook of claim 2, wherein the head includes an eye.

11. The hook of claim 2, wherein the shank and the leg and the valley and the bite are substantially coplanar.

\* \* \* \* \*

UNITED STATES PATENT AND TRADEMARK OFFICE
CERTIFICATE OF CORRECTION

PATENT NO. : 6,691,449 B1
DATED : February 17, 2004
INVENTOR(S) : Donald M. Hoben It is certified that error appears in the above-identified patent and that said Letters Patent is hereby corrected as shown below:

<u>Title page,</u>
Item [73], Assignee, should be -- Matzuo America, Inc., Denver, CO (US) --.

Signed and Sealed this

Tenth Day of August, 2004

JON W. DUDAS
*Acting Director of the United States Patent and Trademark Office*